United States Patent [19]

Kolm

[11] 4,285,363

[45] Aug. 25, 1981

[54] CONTROL VALVE CONSTRUCTION

[75] Inventor: Harvard B. Kolm, Lewiston, N.Y.

[73] Assignee: Hydraulic Servocontrols Corporation, Buffalo, N.Y.

[21] Appl. No.: 91,043

[22] Filed: Nov. 5, 1979

[51] Int. Cl.[3] .................. F16K 11/10

[52] U.S. Cl. .................. 137/596.17; 137/625.64; 137/870

[58] Field of Search .................. 137/596.17, 625.64, 137/870

[56] References Cited

U.S. PATENT DOCUMENTS

| | | | |
|---|---|---|---|
| 3,117,585 | 1/1964 | Gerwig et al. | 137/625.61 |
| 4,126,293 | 11/1978 | Zeuner et al. | 137/625.64 X |
| 4,131,130 | 12/1978 | Ruby | 137/596.17 |

*Primary Examiner*—Gerald A. Michalsky
*Attorney, Agent, or Firm*—Joseph P. Gastel

[57] ABSTRACT

A servovalve including a base, first and second flappers mounted on the base and attached to first and second armatures, respectively, first and second nozzles on the base for discharging fluid, third and fourth nozzles on said base for receiving fluid from the first and second nozzles, respectively, first and second springs for normally biasing the first and second flappers, respectively, into positions for effectively preventing flow of fluid from the first and second nozzles, torque motor structure including first and second coils operatively associated with the first and second armatures for simultaneously causing either one of said flappers to move away from its associated nozzle while the other flapper moves into a more closed relationship with its associated nozzle depending on the direction of current flow through said coils, and gain adjustment blocks mounted on the first and second armatures.

13 Claims, 12 Drawing Figures

Fig. 2.
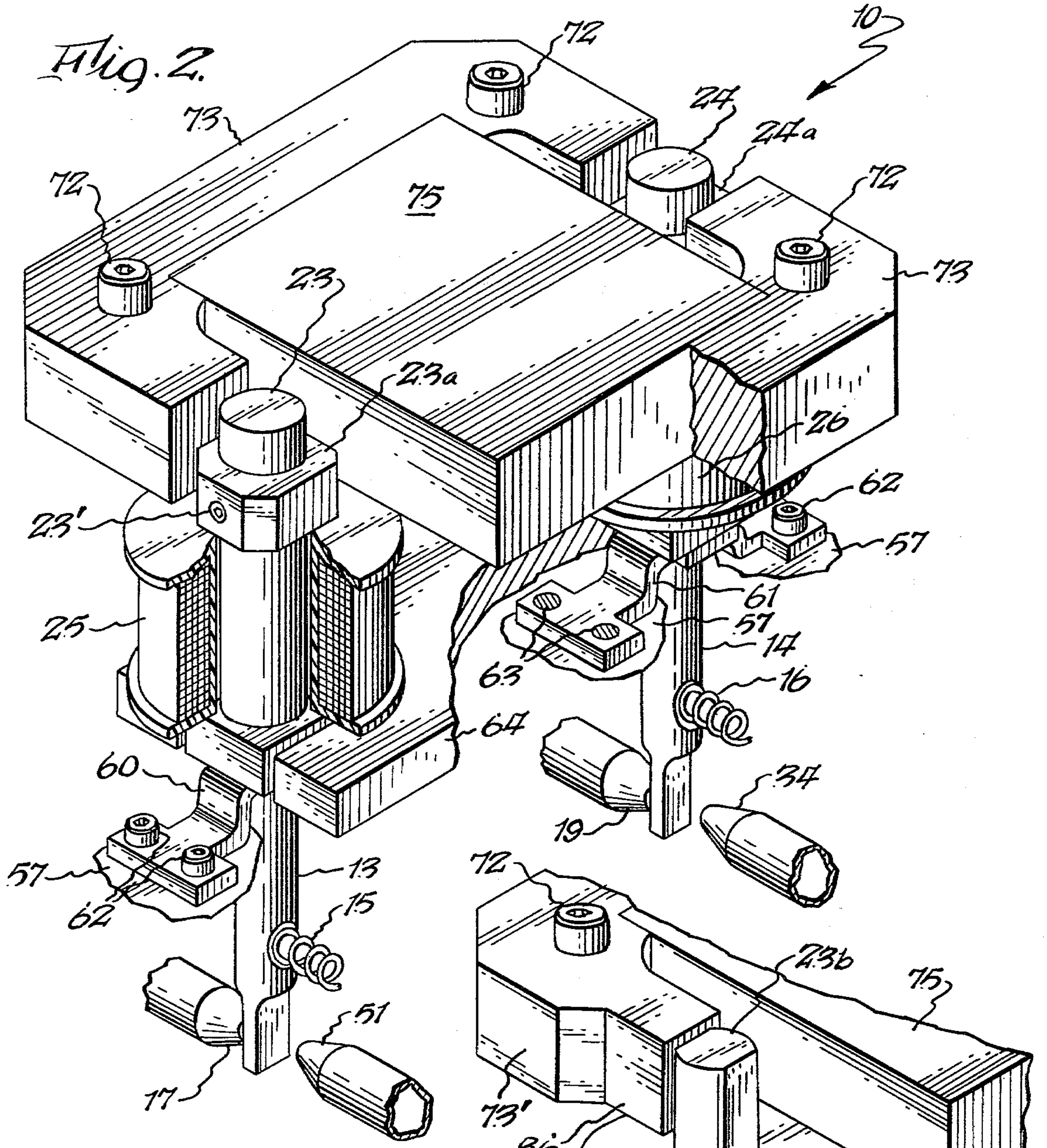
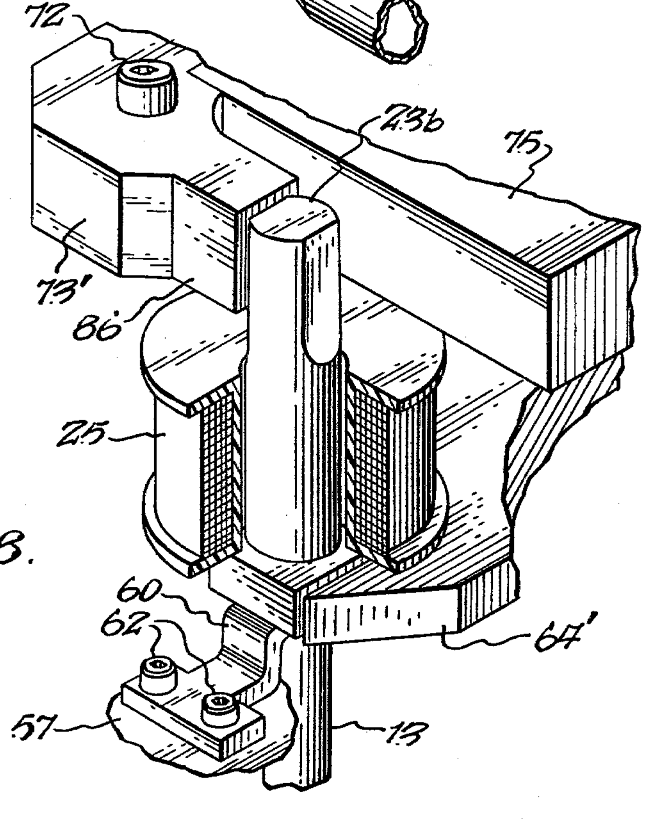
Fig. 8.

CONTROL VALVE CONSTRUCTION

BACKGROUND OF THE INVENTION

The present invention relates to a servovalve, which is also generally known as a fluid control valve, for controlling fluid flow and pressure in response to an electrical control signal.

By way of background, servovalves and systems utilizing servovalves are well known in the art. The prior art includes a double fixed orifice and nozzle-flapper valve, which is also known as a double nozzle-flapper valve and such valve is used to control the position of a spool valve by directing pressurized fluid to opposite ends of the spool valve. The double nozzle-flapper valves of the prior art were deficient in the sense that the flapper arrangement therein permitted continuous fluid flow through the valve, from the source to the reservoir, even when the valve was not energized, and this resulted in wasting the power required to produce the pressurized fluid. In addition, in prior types of systems utilizing a double nozzle-flapper valve, even when the servovalve was not electrically energized, pressurized fluid, at about 20% to 50% of the system pressure, was directed to opposite ends of the spool valve to cause it to remain in a neutral position. However, to shift the spool valve, additional pressurized fluid had to be directed to one end of the spool valve, and this pressurized fluid had to counteract the existing pressurized fluid at the other end of the spool valve. Thus, the differential pressure across prior spool valves was limited to 75%-80% of the supply pressure because pressure was acting on both ends of the spool. This required the system to operate at relatively higher pressures in order to achieve a given force to cause movement of the spool valve. Furthermore, in prior systems employing servovalves, because of the fact that fluid pressure was applied to opposite ends of the spool valve to center it, there could be no manual override of the spool without overcoming the force due to pressurized fluid on the ends of the spool valve. Furthermore, prior systems employing double nozzle-flapper valves were not "fail-safe". In this respect, since pressurized fluid was applied to opposite ends of the spool valve at all times, if a leak occurred in the conduits leading to one end of the spool valve, there would be a loss of pressure and the valve would shift. Additionally, if the spool valve housing experienced leakage, there would be a continuing flow of pressurized fluid to the housing, and such flow would carry impurities with it which would detrimentally affect the spool valve, as by causing undesired friction and possibly even clogging it against movement. Furthermore, in prior servovalve constructions the gain could not be adjusted by effectively varying the configuration of the armature after the servovalve was assembled. It is with overcoming the foregoing deficiencies of prior art servovalves that the present invention is concerned.

SUMMARY OF THE INVENTION

It is accordingly one object of the present invention to provide an improved servovalve wherein the valve, due to its inherent construction, essentially shuts off fluid-flow therethrough when it is not supplied with electrical current, thereby eliminating the waste of power incidental to the production of pressurized fluid which would be required if the fluid flow was not essentially shut off. A related object of the present invention is to provide an improved servovalve which, by having essentially no fluid flow therethrough when the valve is shut off, essentially obviates the carrying impurities to the spool valve with such fluid flow.

Another object of the present invention is to provide an improved servovalve which can be employed in a system to provide a differential pressure to shift a spool valve, which approaches 100% of the pressure at the source because there is no existing pressure on the other end of the spool valve which has to be overcome in order to shift it. A related object of the present invention is to provide an improved servovalve of the foregoing type wherein a manual override can be applied to the spool to shift its position because there is essentially no fluid pressure at the ends of the spool to maintain it in a neutral position. A further related object of the present invention is to provide an improved servovalve which obviates the possibility of the shifting of an associated spool valve in the event that a conduit associated therewith leaks or ruptures.

A further object of the present invention is to provide a gain adjustment block construction for mounting on an armature of a servovalve for adjusting the gain thereof. Other objects and attendant advantages of the present invention will readily be perceived hereafter.

The present invention relates to a servovalve valve comprising a base, first and second flappers mounted on said base, first and second armatures coupled to said first and second flappers, respectively, first and second nozzle means on said base for discharging fluid, third and fourth nozzle means on said base for receiving fluid from said first and second nozzle means, respectively, means for normally biasing said first and second flappers into position for effectively preventing flow of fluid from said first and second nozzle means, respectively, coil means operatively associated with said first and second armatures for simultaneously causing said first flapper to move away from said first nozzle means while said second flapper remains in position for effectively preventing flow through said second nozzle means when current flow through said coil means is in a first direction and for causing said second flapper to move away from said second nozzle means while said first flapper remains in position for effectively preventing flow through said first nozzle means when current flow through said coil means is in a second direction which is opposite to said first direction. The present invention also relates to a gain adjustment block for mounting on the armature of a servovalve to vary the gain thereof. The various aspects of the present invention will be more fully understood when the following portions of the specification are read in conjunction with the accompanying drawings wherein:

BRIEF DESCRIPTION OF THE DRAWINGS

FIG. 2 is a fragmentary perspective view of one embodiment of the improved servovalve of the present invention having gain adjusting blocks mounted on the armatures thereof;

FIG. 8 is a fragmentary perspective view similar to FIG. 2 but showing a modified embodiment of the servovalve which does not have a gain adjustment block;

DESCRIPTION OF THE PREFERRED EMBODIMENTS

Figure 1:
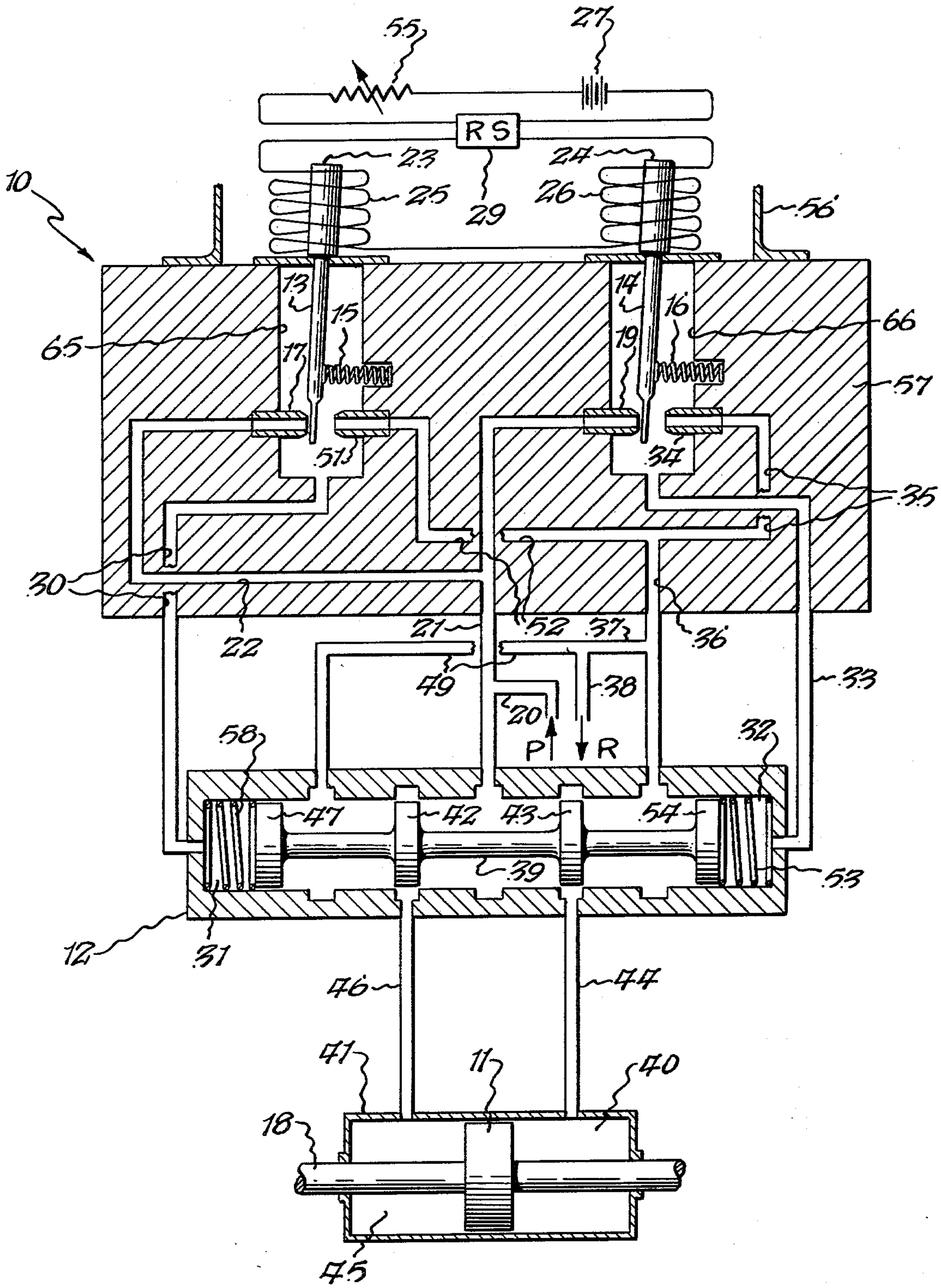
FIG. 1 is a schematic view of a fluid control system incorporating the improved servovalve of the present invention.
Figure 3:
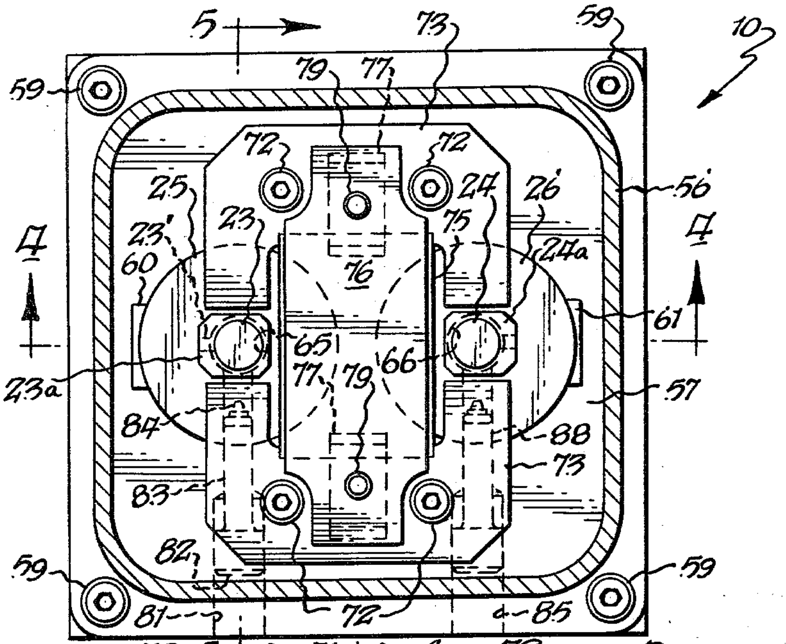
FIG. 3 is a cross sectional view taken substantially along line 3—3 of FIG. 4 and showing the various components of the servovalve in plan.
Figure 4:
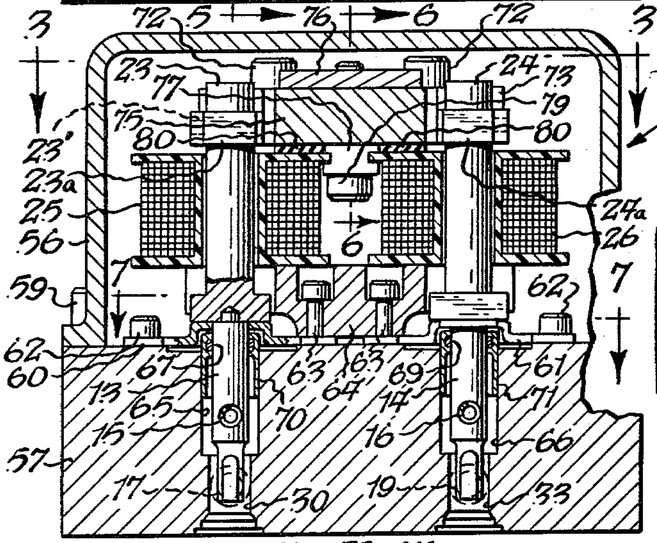
FIG. 4 is a fragmentary cross sectional view taken substantially along line 4—4 of FIG. 3.
Figure 6:
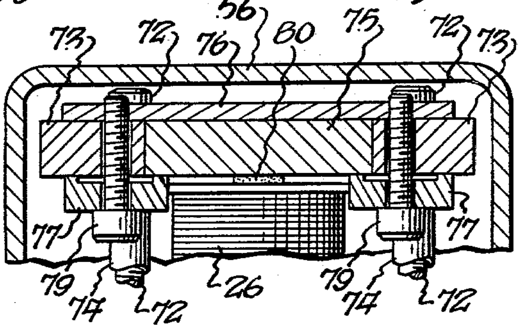
FIG. 6 is a fragmentary cross sectional view taken substantially along line 6—6 of FIG. 4 and showing the manner in which the pole pieces and magnet are secured to each other.
Figure 5:
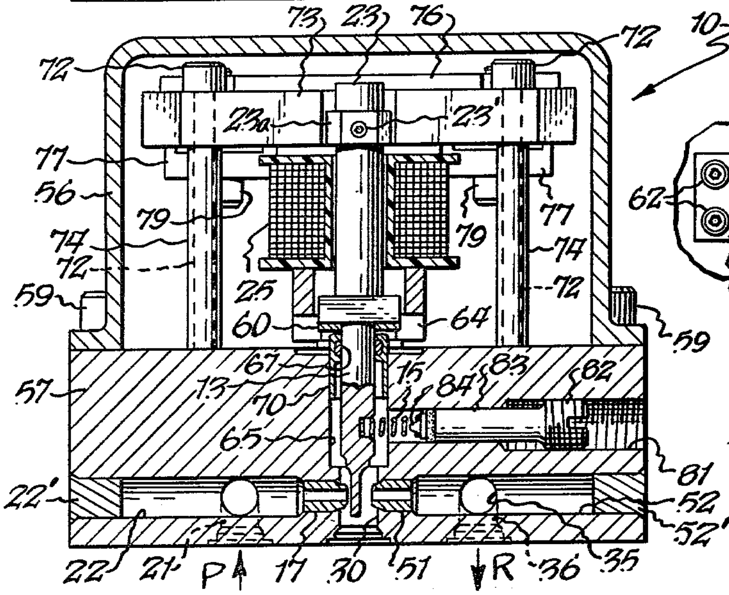
FIG. 5 is a cross sectional view taken substantially along line 5—5 of FIG. 3.
Figure 7:
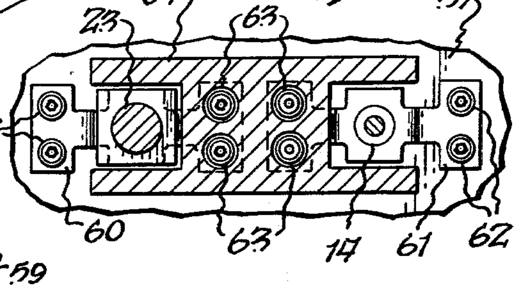
FIG. 7 is a fragmentary cross sectional view taken substantially along line 7—7 of FIG. 4 and showing the relationship between the pivot springs, armatures, and armature shunt.

The improved valve 10 is shown schematically in FIG. 1 in a system for controlling the position of piston 11 through spool valve 12. Normally the flappers 13 and 14 of valve 10 are biased by springs 15 and 16, respectively, to a substantially closed position to permit only minimal fluid flow of only about 2%-3% through nozzles 17 and 19, respectively. Therefore, only minimal amounts of fluid under pressure from source P can pass through nozzles 17 and 19. In this respect, nozzle 17 is in communication with source P through conduits 20, 21 and 22, and nozzle 19 is in communication with source P through conduits 20 and 21. Armatures 23 and 24 essentially are extensions of flappers 13 and 14, respectively, and the armatures have coils 25 and 26 associated therewith, as is well known in the art. In the embodiment shown, coils 25 and 26 are wound in opposite directions and are in series with each other. Thus, when valve 10 is energized by causing current flow in one direction, one flapper will move to a more open position with respect to its initially associated nozzle while the other flapper tends to move to a more closed position with respect to its initially associated nozzle, and when the valve is energized by causing current flow in the opposite direction, the opposite occurs.

In order to energize valve 10 to cause piston 11 to move to the left to move shaft 18 to the left, a circuit is completed from electrical source 27 to coils 25 and 26 through reversing switch 29, which may be of any suitable construction. The flow of current through coils 25 and 26 will cause flapper 13 to move toward the right in FIG. 1 to a more open position relative to nozzle 17 while flapper 14 will tend to move to the left to a more closed position relative to nozzle 19, so that there will be essentially no fluid flow through nozzle 19. Therefore, there will now be a flow of fluid from source P through conduits 20, 21 and 22, nozzle 17, and conduit 30 to chamber 31 of spool valve 12. At the same time, chamber 32 of spool valve 12 will be in communication with the reservoir R through conduit 33, nozzle 34, and conduits 35, 36, 37 and 38. As a result of the foregoing, spool 39 will move to the right against the bias of springs 53 and 58 so that the source of fluid P will be in communication with chamber 40 of housing 41 through conduits 20 and 21, the space between lands 42 and 43, and conduit 44. At the same time chamber 45 will be in communication with the reservoir through conduit 46, the space between lands 42 and 47, and conduits 49 and 38. The excess fluid flow from nozzle 17 will be routed to the reservoir R through nozzle 51, and conduits 52, 36, 37 and 38. Whenever current flow through coils 25 and 26 is terminated, flappers 13 and 14 will assume the position shown in FIG. 1 under the influence of springs 15 and 16, respectively, so that chambers 31 and 32 will now be in communication with the reservoir through the above-described conduits and springs 53 and 58 will cause spool 39 to return to the neutral position shown in FIG. 1. In the foregoing respect chamber 31 will be in communication with reservoir R through conduit 30, nozzle 51, and conduits 52, 36, 37 and 38; and chamber 32 will be in communication with reservoir R through conduit 33, nozzle 34, and conduits 35, 36, 37 and 38. It is to be noted that when spool 39 is in the neutral position, there is no fluid pressure on the outside faces of lands 47 and 54 because chambers 31 and 32 are vented to reservoir R, so that spool 39 may be manually actuated to any desired position through a suitable linkage, not shown, to cause piston 11 to move to a desired position. When spool valve 39 is in the neutral position, lands 42 and 43 will block conduits 46 and 44, respectively, to thereby cause piston 11 to remain in the position to which it was last moved. It is to be especially noted that when the nozzles are blocked by the flappers, chambers 31 and 32 will be vented to reservoir R. Thus, if there is a leak in any conduit leading to chambers 31 and 32, this will have no effect on the position of spool 39.

It will be appreciated that as flapper 13 moves away from nozzle 17 and toward nozzle 51, the flow from nozzle 17 will increase while simultaneously the flow through nozzle 51 becomes more restricted, and the build-up of pressure in chamber 65 is applied to spool chamber 31, with the exact pressure being determined by the position of flapper 13. Thus, during the above-described action, as flapper 13 progressively moves away from nozzle 17 toward nozzle 51, the pressure in conduit 30 and spool end chamber 31 proportionally increased from return pressure to supply pressure, thereby causing a proportional movement of spool 13 against its restraining springs 53 and 58. In the end, the position of spool 39, the pressure in conduit 30 and spool end chamber 31, and the position between the nozzles of flapper 13 all become proportional to the current in coils 25 and 26. It is to be noted that while the pressure in chamber 31 is building up, the pressure in conduit 33 and in spool end chamber 53 remains essentially at zero, or return or reservoir pressure, since flapper 14 is being urged against nozzle 19. An analogous action occurs when flapper 14 is moved away from nozzle 19 and toward nozzle 34 as described hereafter.

Whenever it is desired to move piston 11 to the right, the reversing switch 29 is actuated to cause current flow in the direction opposite to that which produced the above action so that flapper 14 will move away from nozzle 19, but flapper 13 will be forced more toward nozzle 17 to maintain the closed condition. When this occurs, there will be fluid flow to chamber 32 of spool valve 12 while chamber 31 is placed in communication with the reservoir R so that spool 39 will move to the left against the bias of springs 53 and 58. This will cause chamber 45 to be placed in communication with the source of pressurized fluid P through conduit 46 and the space between spool lands 42 and 43, while chamber 40 is placed in communication with the reservoir R through conduit 44 and the space between spool lands 43 and 54. As a result, piston 11 will move to the right until the flow of current through coils 25 and 26 is terminated, and thereafter flappers 13 and 14 will return to the position shown in FIG. 1, and spool 39 will return to a neutral position shown in the drawing to thereby maintain piston 11 in the position to which it was last moved. Since flappers 13 and 14 essentially stop the fluid flow through nozzles 17 and 19, respectively, there will be no waste of power which otherwise would be required to supply pressurized fluid.

It is to be noted that a variable resistance 55 is placed in the circuit to control the amount of current supplied to coils 25 and 26, and this will control the position to which flappers 13 and 14 are moved as a result of actuating reversing switch 29. In like proportional manner the position of spool 39 will be in accordance with the current in coils 25 and 26.

A first embodiment of the improved valve 10 is shown in FIGS. 2–7 wherein corresponding numerals of FIG. 1 will be used to designate corresponding parts. In this respect, valve 10 includes a housing 56 which is secured to base 57 by screws 59. Flappers 13 and 14 are secured to pivot springs 60 and 61, respectively, in the conventional manner, and the outer ends of pivot springs 60 and 61 are secured to base 57 by screws 62. The inner ends of pivot springs 60 and 61 are secured to block 57 by screws 63 which also extend through suitable bores in shunt 64, to thereby also secure shunt 64 to base 57. Flappers 13 and 14 extend into bores 65 and 66, respectively, in base 57. O-rings 67 and 69 are held in isolation tubes 70 and 71 which are fitted into bores 65 and 66, respectively, to prevent fluid in bores 65 and 66 from passing upwardly out of these bores. Armatures 23 and 24 are secured to flappers 13 and 14, respectively, but are located on the upper sides of springs 60 and 61, respectively. Coils 25 and 26 have their lower surfaces resting on the upper surface of shunt 64 and the central holes in coils 25 and 26 are of a size so that the coils are not in contact with the armatures 23 and 24, respectively. Screws 72 extend through suitable bores in pole pieces 73 and are received in tapped bores in block 57. Spacers 74 surround screws 72 to locate the pole pieces 73 in spaced relationship to base 57.

The pole pieces 73 and permanent magnet 75 form a subassembly which is held together by nonferrous (or non-magnetic) plate 76 extending across the tops of pole pieces 73 and magnet 75 (FIG. 6) and by clamps 77 on the undersides of magnet 75 and pole pieces 73. Screws 79 extend through clamps 77 and pole pieces 73, and are received in threaded engagement in plate 76. Resilient spacers 80, which may be made of rubber, are located between the tops of the coils and the undersurface of magnet 75.

A tapped bore 81 is provided in base 57 to receive the head 82 of spring adjusting pin 83 in threaded relationship. The end 84 of pin 83 bears against spring 15 to adjust it to the proper degree of compression. Thereafter, pin 83 is immobilized. A tapped bore 85, which is identical to tapped bore 81, is associated with flapper 14 and a pin 88, which is identical to pin 83, is associated with tapped bore 85 in the same manner as described above relative to pin 83 and bore 81, to adjust spring 16 to the proper degree of compression. Plugs 22′ and 52′ (FIG. 5) seal the ends of bores 22 and 52, respectively.

As noted above, in view of the fact that the windings of coils 25 and 26 are in opposite directions, when current is applied to these coils in a first direction, so that flapper 13 tends to move away from associated nozzle 17, flapper 14 will move into tighter relationship with its associated nozzle 19. When the flow of current is reversed, flapper 14 will tend to move away from its associated nozzle 19 while flapper 13 tends to move into tighter sealing relationship with its associated nozzle 17. It will be appreciated that the coils 25 and 26 need not be wound in opposite directions to obtain the same result, namely, to cause one of the nozzles to move away from its associated nozzle while the other moves into tighter closing relationship with its associated nozzle. The same result can be achieved by varying the magnetics and the fluid conduits appropriately. The main condition is that the windings of the two coils must be such that the armatures are of different polarities in the air gap, and the reversal of current will reverse the polarity.

It will be appreciated that the pressure in chambers 65 and 66 surrounding flappers 13 and 14, respectively, is determined by the relative positions of the flappers between the two nozzles associated with each flapper. More specifically, the pressure in chamber 65 is determined by the relative position between nozzles 17 and 51, and the pressure in chamber 66 is determined by its relative position between nozzles 19 and 34. Except when movement of spool 39 or leakage requires flow to be drawn from or directed to the flapper chambers 65 and 66, the flow going out of one nozzle merely goes around the flapper end exits through the opposite nozzle.

In accordance with another aspect of the present invention, gain adjustment blocks **23*a* and 24*a*, which are fabricated of magnetic material, are mounted in sliding relationship on armatures 23 and 24, respectively, so that they can be moved to any adjusted position, and thereafter each is tightened by a set screw, such as 23′. By adjusting the position of blocks 23*a* and 24*a*** on their respective armatures, the gain of both sides (or each half) can be adjusted. In the embodiment shown, the gain is effectively adjusted by varying the effective lever arm length of the armatures, which is the distance between the pivot spring and the geometric center of the gain adjustment block. When the gain adjustment block is wholly within the space between the pole pieces, it does not vary the magnetics across the air gap, and therefore its only influence is to vary the lever arm. However, if it extends outside of the space between the pole pieces, both the influence of the gain adjustment blocks on the magnetic forces and the length of the lever arm affect the gain.

In FIG. 8 a modified form of the present invention is disclosed. The servovalve of FIG. 8 may be identical in all respects to the servovalve of FIGS. 2–7 except that the gain adjustment blocks are not provided on the armatures. Furthermore, the end 86 of pole piece 73′ has a different shape than the end of pole piece 73 of FIGS. 2–7, and shunt 64′ has a different configuration. Aside from the foregoing changes, the other structure of the embodiment of FIG. 8 may be identical to the embodiment of FIGS. 2–7.

It is to be noted relative to the embodiments of FIGS. 2–7 and 8, wherein two coils are used, if one of the coils should for any reason become inoperative, the energization of the other coil will cause the valve to operate in its intended manner even though the coils are connected in series, unless the circuit through the coils is open. However, to overcome the possibility of a total malfunction due to an open circuit in one of the coils, it may be desirable for the coils to be connected in parallel with the source of current, rather than in series, as shown.

In FIGS. 9–12 servovalve 90 is shown, which is a still further embodiment of the present invention. A housing 91 is secured to base 92 by suitable screws. The conduits and flappers are located within base 92, in the same manner as the flappers and conduits are located in base 57 of the embodiment of FIGS. 2–7, and therefore, this structure will not be described again relative to the embodiment of FIGS. 9–12.

The main difference between the embodiment of FIGS. 9–12 and the embodiment of FIGS. 2–7 and FIG. 8 is that only one coil 93 is used rather than two coils. In this respect, coil 93 is supported by non-magnetic bracket 94 on pedestal 95. A magnetic core 96, which is held by bracket 94, has its opposite ends adjacent armatures 97 and 99 which are coupled to flappers 100 and 101, respectively, through pivot springs 102 and 103, respectively, which are secured to base 92 by screws 104. Permanent magnet 105 is supported by pole pieces 106 which are secured to base 92 by screws 107 which extend through suitable bores in the pole pieces. Gain adjustment blocks 109 are movably mounted on armatures 97 and 99 in the same manner as described above relative to FIG. 2.

Figure 9:
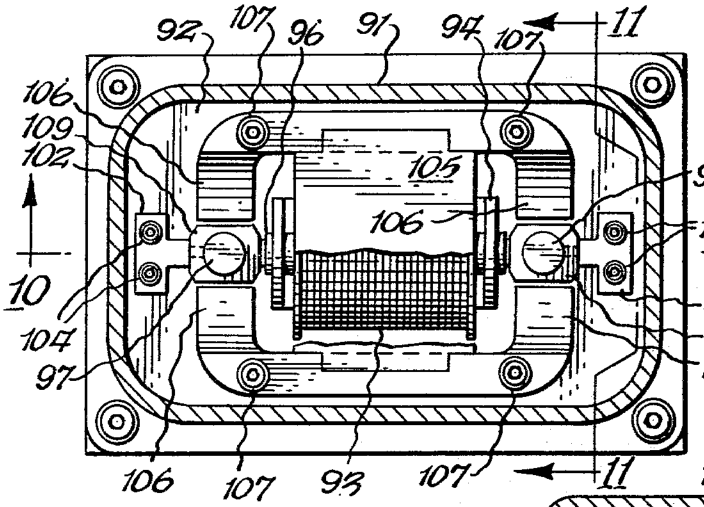
FIG. 9 is a cross sectional view taken substantially along line 9—9 of FIG. 10 and showing a modified embodiment of the present invention which utilizes only a single coil.
Figure 10:
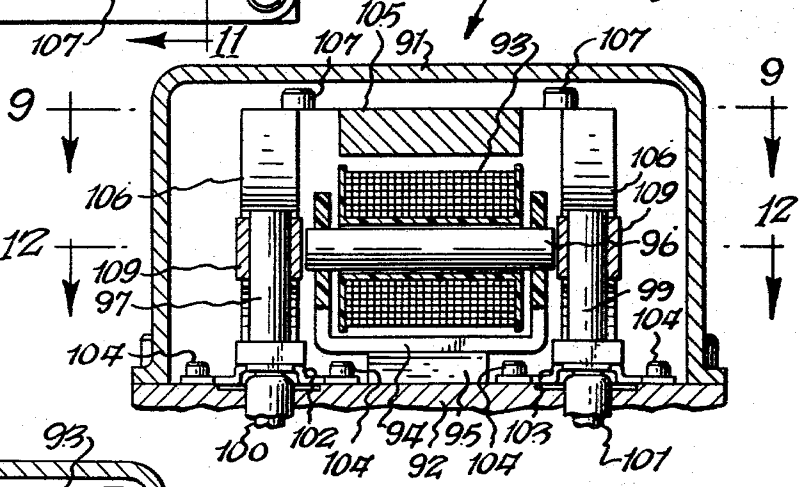
FIG. 10 is a fragmentary cross sectional view taken substantially along line 10—10 of FIG. 9.
Figure 11:
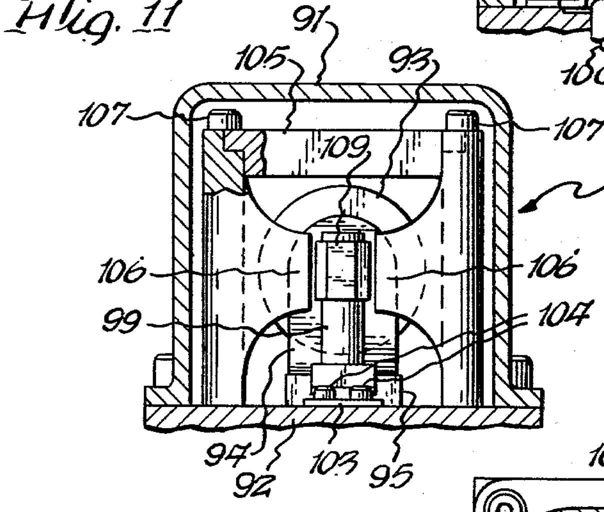
FIG. 11 is a fragmentary cross sectional view taken substantially along line 11—11 of FIG. 9.
Figure 12:
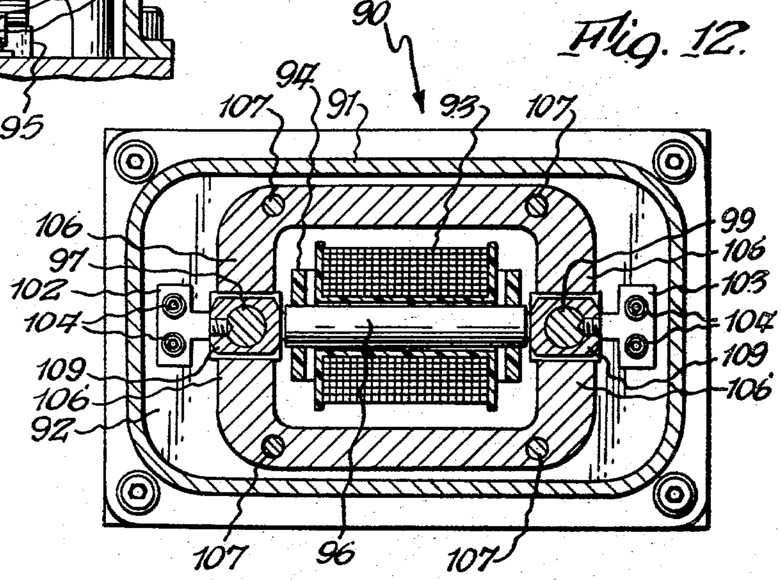
FIG. 12 is a cross sectional view taken substantially along line 12—12 of FIG. 10.

In operation, and when referring to FIG. 9, whenever current is passed through coil 93, in a first direction, armature 97 will be moved toward upper left-hand pole piece 106 while armature 99 will be moved toward lower right-hand pole piece 106, and when the current flow through coil 93 is reversed, armature 99 will be pulled toward upper right-hand pole piece 106 while armature 97 will be moved toward lower left-hand sole piece 106. The flappers 100 and 101 will be biased in the same manner as shown in FIG. 2, and the associated nozzles will be positioned so that the same result is obtained as described above in detail relative to FIG. 2.

It can thus be seen that the improved servovalve of the present invention is manifestly capable of achieving the above enumerated objects, and while preferred embodiments have been disclosed, it will be appreciated that the present invention is not limited thereto but may be otherwise embodied within the scope of the following claims.

What is claimed is:

1. A servovalve comprising a base, first and second flappers mounted on said base, armature means coupled to said first and second flappers, respectively, first and second nozzle means on said base for discharging fluid, third and fourth nozzle means for receiving fluid from said first and second nozzle means, respectively, means for normally biasing said first and second flappers into position for effectively preventing flow of fluid from said first and second nozzle means, respectively, and coil means operatively associated with said armature means for simultaneously causing said first flapper to move away from said first nozzle means while said second flapper remains in position for effectively preventing flow through said second nozzle means when current flow through said coil means is in a first direction, and for causing said second flapper to move away from said second nozzle means while said first flapper remains in position for effectively preventing flow through said first nozzle means when current flow through said coil means is in a second direction which is opposite to said first direction.

2. A servovalve as set forth in claim 1 wherein said armature means comprises a first armature coupled to said first flapper, and a second armature coupled to said second flapper.

3. A servovalve as set forth in claim 2 including first and second gain adjusting blocks on said first and second armatures.

4. A servovalve as set forth in claim 2 wherein said coil means comprises a first coil operatively associated with said first armature and a second coil operatively associated with said second armature.

5. A servovalve as set forth in claim 4 wherein said first and second coils are wound in opposite directions.

6. A servovalve as set forth in claim 4 wherein said first and second coils are in series with each other.

7. A servovalve as set forth in claim 1 wherein said coil means comprises a single coil.

8. A servovalve as set forth in claim 7 wherein said armature means comprises a first armature coupled to said first flapper, and a second armature coupled to said second flapper.

9. A servovalve as set forth in claim 8 wherein said first and second armatures are located at opposite ends of said single coil.

10. A servovalve as set forth in claim 9 including a magnetic core in said coil.

11. A servovalve as set forth in claim 1 including first and second conduit means for conducting pressurized fluid from said first and second nozzle means, respectively, to the opposite chambers of a spool valve.

12. A servovalve as set forth in claim 11 including third and fourth conduit means for placing said first and second conduit means, respectively, in communication with a reservoir.

13. A servovalve as set forth in claim 1 including gain adjustment block means on said armature means for adjusting the gain of said servovalve.

* * * * *